July 1, 1969     J. C. STILES     3,452,608

TUBULAR HINGE SUSPENSION FOR A GYRO ROTOR

Filed March 1, 1967

INVENTOR.
JOHN C. STILES

BY *Constantine A. Michalos*

ATTORNEY

United States Patent Office 3,452,608
Patented July 1, 1969

3,452,608
TUBULAR HINGE SUSPENSION FOR A GYRO ROTOR
John C. Stiles, Mountain Lakes, N.J., assignor to General Precision Systems Inc., Little Falls, N.J., a corporation of Delaware
Filed Mar. 1, 1967, Ser. No. 619,649
Int. Cl. G01c 19/02
U.S. Cl. 74—5                                      6 Claims

ABSTRACT OF THE DISCLOSURE

A tubular hinge suspension for a gyro rotor having a drive shaft with a pair of integral radially outwardly extending portions having ends extending substantially parallel to the axis of said shaft, a toroidal rotor operably rotatable and extending substantially perpendicular to the axis of said shaft, and having integral radially inwardly extending portions, a central connecting ring, coaxially to, and within the central area of said toroidal rotor, and four radially extending circular tubing, two of the tubing interposed between and connecting the ends of the radial portions of the shaft with said connecting ring and two of the tubing interposed between and connecting the radial portions of said toroidal rotor with said connecting ring, in universal joint arrangement. Each tubing having a local slot machined into it parallel to the axis of the shaft and which defines the torsionally compliant section of the assembly. When the whole assembly is accelerated along the spin axis, which is substantially coextending with the axis of the shaft, all four tubular hinges are stressed in bending, when it is accelerated at right angles to the spin axis, only two hinges are stressed in bending at any moment, the other two being stressed in the far more rigid compression and extension mode.

BACKGROUND OF THE INVENTION

Field of the invention

This invention relates generally to gyro rotor hinge suspension, and more particularly to a tubular hinge suspension for a gyro rotor which is extremely compliant for rotation about each of two perpendicular axes and extremely rigid for all linear displacements.

Description of the prior art

Heretofore, the method of performing the function of suspending a gyro rotor as in the case described and claimed in the U.S. Patent No. 3,354,726, entitled "Two-Axis Gyro" by Walter J. Krupick and Richard F. Cimera, assigned to General Precision, Inc., the same assignee as the present invention, involved an assembly of flexure springs having local thin sections, which deflected in bending only. Two such assemblies were required, one to support the rotor against radial motion, and the other to support the rotor against axial motion.

SUMMARY OF THE INVENTION

The present invention combines both the means to support the rotor against radial motion and the means to support the rotor against axial motion into a single structure which has the same angular compliance as the heretofore structure and is even more rigid against linear forces. In addiiton, the critical parts are made from standard drawn tubing and no precision machining is required. Furthermore, since only one structure is involved instead of two, there is no problem of adjusting two flexural centers to coincide.

Therefore, an object of this invention is to provide for a flexure tubular hinge suspension for a gyro rotor which is extremely compliant for rotation about each of two perpendicular axes and extremely rigid for all linear displacements.

Another object of this invention is to provide for a flexure joint having a single unit operably supporting a gyro rotor against radial motion and at the same time, supporting the gyro rotor against axial motion.

An additional object of this invention is to provide for a tubular hinge assembly in which the critical parts are made from standard drawn tubing wherein no precision machining is required.

A further object of this invention is to provide for a tubular hinge suspension wherein a single structure is used in place of the heretofore two structures, whereby the single structure is easier to adjust over the heretofore two flexure structures.

An additional object of this invention is to provide for a hinge suspension, which is much simpler in fabrication and is of a higher quality for supporting a gyro rotor in both a radial and in an axial motion.

Other objects and many additional advantages will be more readily understood by those skilled in the art after a detailed consideration of the following specification taken with the accompanying drawings.

DESCRIPTION OF THE PREFERRED EMBODIMENT

Figure 1:
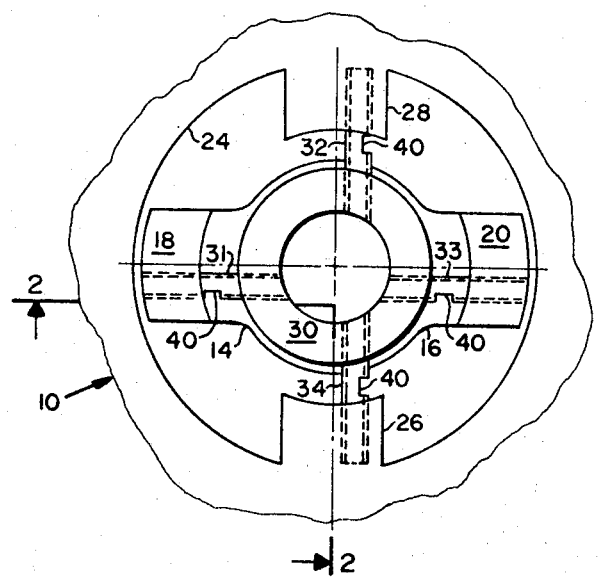
FIGURE 1 is a plan view showing the tubular hinge suspension in accordance with a preferred embodiment of this invention.
Figure 2:
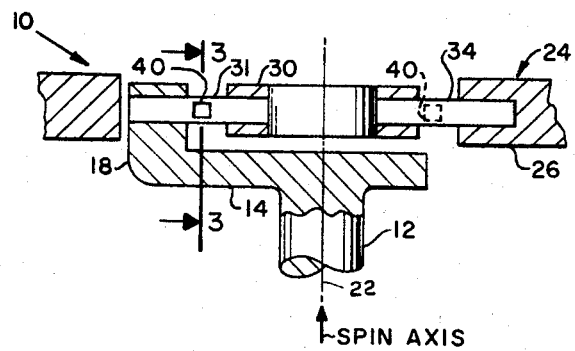
FIGURE 2 is a side sectional view of the hinge suspension taken along line 2—2 of FIGURE 1; and, FIGURE 3 is an enlarged sectional view of one element of the suspension hinge taken along line 3—3 of FIGURE 2.

Referring to the drawing, the present invention comprises a gyro 10 including a drive shaft 12 having a pair of integral offset radially outwardly extending portions 14 and 16 with ends 18 and 20 extending substantially parallel to an axis 22 of the shaft 12 which is substantially coextending with the spin axis of the gyro 10. The gyro 10 also comprises a toroidal flywheel rotor 24 operably rotatable and extending substantially perpendicular to the axis 22 of the shaft 12 and having integral radially inwardly extending portions 26 and 28. In addition, the gyro 10 includes a central connecting ring 30 coaxially to and located within the central area of the toroidal gyro rotor 24. Furthermore, the invention illustrated includes four lengths of circular tubing or hinges 31, 32, 33 and 34. Two of the hinges (31 and 33, are interposed between and connect the ends 18 and 20 of the radial portions 14 and 16 of the shaft 12 with the connecting ring 30 and two of the hinges 32 and 34 are interposed between and connect the radial portions 26 and 28 of the toroidal rotor 24 with connecting ring 30 in a universal joint arrangement. In short, the hinges 31 and 33 extend radially outwardly from the connecting ring 30 to be rigidly connected to the ends 18 and 20 of the shaft 12 and the hinges 32 and 34 extend inwardly from the portions 26 and 28 of the rotor 24, respectively to be rigidly connected to the central connecting ring 30. It should be noted at this point that the hinges 31, 32, 33 and 34 are offset from the center of symmetry of the shaft 12 and rotor 24 an amount approximately 10% of the actual diameter of the tubular hinge. The reason for offsetting the tubular hinges 31, 32, 33 and 34 is to provide for their torsion axes, the axes about which the rotor rotates, as best shown in FIGURE 3, to coincide or intercept the center of symmetry of the rotor-shaft assembly.

The invention illustrated in the drawing shows the drive shaft 12, the rotor 24, and the connecting ring 30, connected by the four lengths of circular tubular hinges 31, 32, 33 and 34 in the form of a universal joint or Hooke's joint arrangement.

Figure 3:
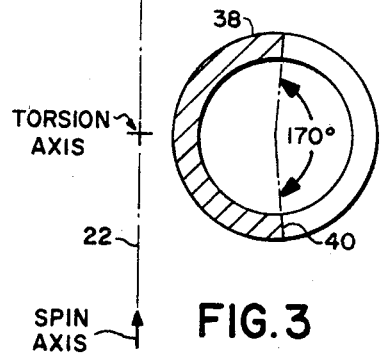

As best shown in FIGURE 3, the tubular hinges 31, 32, 33 and 34 have a local slot 40 machined into them which defines the torsionally compliant section of the assembly. The hinge slot 40 extends 170° for the tubular thickness shown. It will be noted that for a certain thickness of the tubing, the angle may vary depending on the diameter and length of the slot and the Poisson ratio of the material.

The slot 40 has two functions: first, its presence greatly increases the torsional compliance as compared to an unslotted tube; second, it provides for a means of controlling the isoelasticity of the assembly. It will be appreciated that the force deflection characteristic relationship is equal in all directions in this unit. That is, it is necessary in all gyros to prevent error torques in the presence of vibration, and therefore, the gyros are designed to be isoelastic.

It should be noted that when the whole assembly is accelerated along the spin axis, all four hinges, 31, 32, 33 and 34 are stressed in bending; when it is accelerated at right angles to the spin axis, only two hinges are stressed in bending at any moment, the other two being stressed in the far more rigid compression and extension mode. To have equal compliance in the directions along the axial or along the spin axis and radial, or right angles to the spin axis, a condition necessary for precision gyros, it is necessary to weaken the hinges in the radial direction while maintaining the axial stiffness.

As brought out before, the slot 40 is shown in the proper position to accomplish this above-mentioned relationship, and in the actual configuration indicated in FIGURE 3, the slot should cover an arc of 170°. Note again, that the torsion axis, that is the axis about which the rotor rotates in the absence of external forces, is not concentric with the tubular hinge, but rather lies outside the tubular section by an amount equal to approximately 10% of the diameter of the tubular hinge. For this reason, the tubular hinges are mounted off dead center so that the torsion axes may intersect at the center of symmetry of the rotor and shaft assembly. This arrangement is required to avoid rectification of the vibration at harmonics of the spin frequency. That is, since the overall system is a universal joint, the rotor pivots about some point defined by the intersection of the two torsion axes. Generally, the rotor will be balanced about the spin axis to avoid unbalanced loads on the bearings or drive shaft, however, the rotor is effectively supported at its pivot point. If the pivot point does not lie on the spin axis, and if the whole assembly is vibrated along the spin axis, an unbalanced torque moment will exist that tends to precess the rotor. Since the rotor, because of its rotation, tends to average out such torque moment, this is not generally important, but when the vibration occurs at the rotor spin frequency or at its harmonic the torque moments may rectify to give a net steady torque on the rotor. This error torque will make it drift. But in this case, we have the torsion axes intercepting the spin axes and therefore, there is no torque moment produced.

Therefore, as outlined above, this invention provides for the use of a single structure to support both the axial and radial forces. The use of this simple tubular hinge arrangement allows the fabrication of the tubular hinges from commercially drawn tubing. The use of a torsional hinge rather than a bending hinge achieves high angular compliance while maintaining linear rigidity. The control of the depth of the slot in the hinge permits relatively simple control of isoelasticity. In addition, the use of a drawn tubing provides for a better material characteristic and uniformity of grain orientation as compared to parts machined from bulk stock.

It should also be understood, while the drawing shows the hinge to be assembled to the connecting ring and to the rotor and shaft through the use of two tubular hinges extending outwardly from the connecting ring, and two extending inwardly from the end portions of the shaft, the hinge could be equally effective if two opposite tubular hinges extend inwardly to attach to the shaft and two opposite tubular hinges extend outwardly to attach to the rotor.

While the present invention has been described in a preferred embodiment, it will be obvious to those skilled in the art that various modifications can be made therein within the scope of the invention, and it is intended that the appended claims cover all such modifications.

What is claimed is:

1. A hinge suspension for use in a gyroscope including a drive shaft and a rotor, said suspension comprising a connecting ring supported at the center of said rotor and a plurality of tubular hinges interposed between said drive shaft, said connecting ring and said rotor, said shaft including a pair of opposed portions extending radially outwardly from the axis of said shaft, each of said opposed outwardly directed portions having an edge portion extending in a direction parallel to said axis, a pair of said tubular hinges extending inwardly toward said axis from said respective edge portions for connection to said connecting ring so as to support the latter substantially coaxially along the spin axis of said rotor and the axis of said shaft, and a pair of opposed tubular hinges extending perpendicular to the first pair of hinges for supporting said rotor from said connecting ring whereby said shaft is operably connected to said rotor in the form of a universal joint.

2. The structure of claim 1, wherein each of said tubular hinges includes a localized slot for weakening the hinges in the radial direction while maintaining the axial stiffness thereof.

3. The structure of claim 1, wherein each of said tubular hinges includes a localized slot extending in the radial direction and perpendicularly to its axis for weakening each said hinge in the radial direction while maintaining the axial stiffness thereof and wherein each of said tubular hinges has its torsion axis lying outside its circular cross-section by a predetermined amount.

4. The structure of claim 1, wherein the torsion axis of each of said tubular hinges lies outside its circular cross-section by an amount approximately 10% of its diameter.

5. A torsional hinge suspension for use in a gyroscope including a rotor and a drive shaft comprising, a connecting ring interposed between said rotor and said drive shaft, a first pair of opposed tubular hinges for radially connecting the shaft to said ring, a second pair of opposed tubular hinges perpendicularly disposed relative to said first pair for radially connecting the rotor to said ring, each of said tubular hinges including a similarly located slot whereby each of said slots is effective to shift the torsion axis of each hinge outside its respective circular cross-section and wherein each said pair of opposed tubular hinges is displaced from the corresponding rotation axis associated with said suspension so that each torsion axis is substantially colinear with its respective rotation axis.

6. The apparatus of claim 5 wherein
said rotor is substantially toroidal in shape, and
said connecting ring is supported coaxially within the central opening of said rotor.

References Cited

UNITED STATES PATENTS

| 2,715,007 | 8/1955 | Zeitlin | 74—5 XR |
| 2,735,731 | 2/1956 | Freebairn et al. | 74—5 XR |
| 2,797,580 | 7/1957 | Taylor | 74—5 |
| 3,026,692 | 3/1962 | Budnick | 64—15 |
| 3,211,011 | 10/1965 | Litty | 74—5 |
| 3,315,533 | 4/1967 | Litty | 74—5 |
| 3,360,255 | 12/1967 | Ormond | 64—15 XR |

C. J. HUSAR, *Primary Examiner.*

U.S. Cl. X.R.

64—15